Sept. 25, 1956          R. A. BUB ET AL          2,764,258
              FILTER AND METHOD OF FABRICATION
                     Filed May 10, 1954
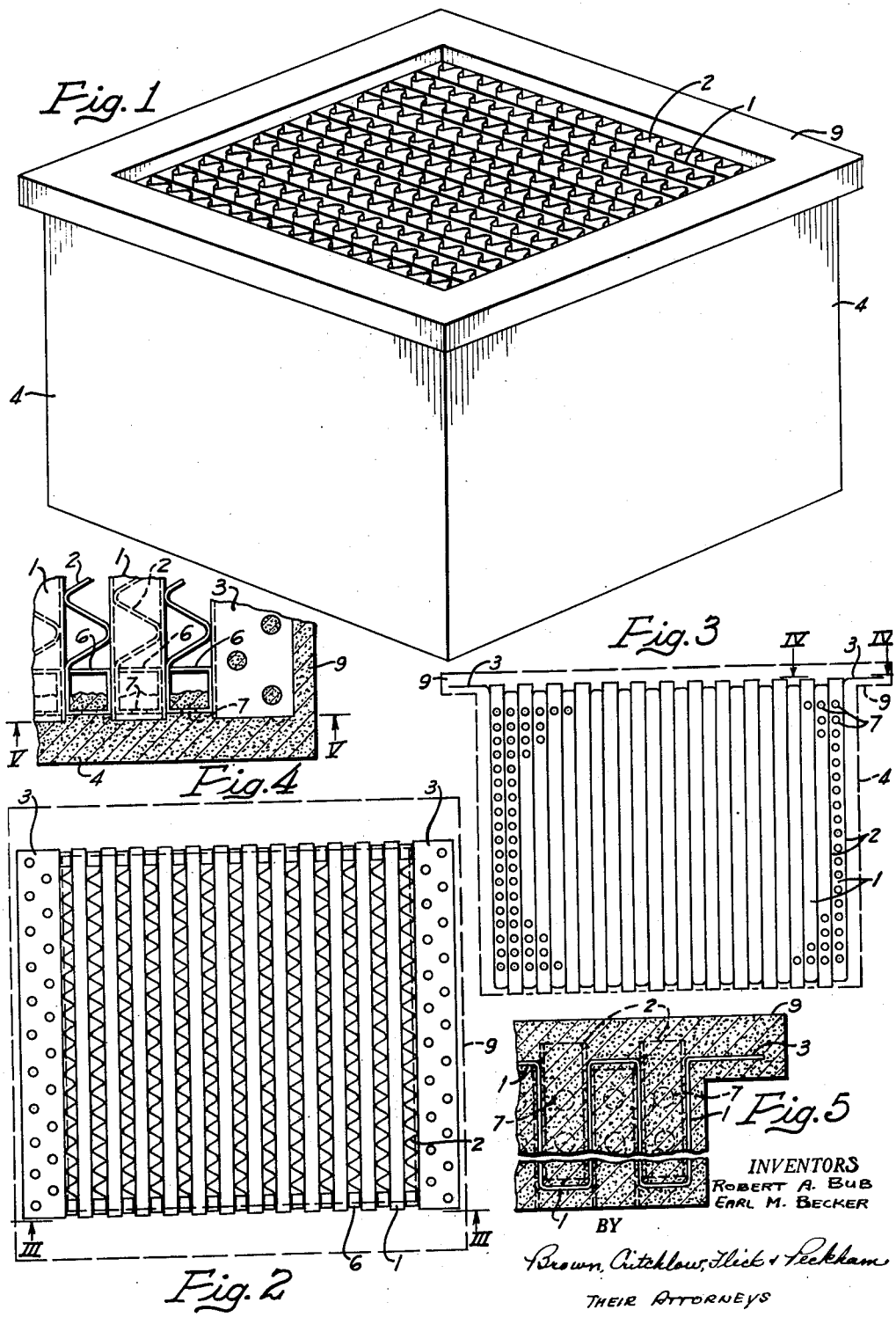
INVENTORS
ROBERT A. BUB
EARL M. BECKER
BY
Brown, Critchlow, Flick & Peckham
THEIR ATTORNEYS

United States Patent Office 2,764,258
Patented Sept. 25, 1956

2,764,258

FILTER AND METHOD OF FABRICATION

Robert A. Bub, Penn Township, Allegheny County, and Earl M. Becker, Pittsburgh, Pa., assignors to Mine Safety Appliances Company, a corporation of Pennsylvania Application May 10, 1954, Serial No. 428,675

9 Claims. (Cl. 183—71)

This invention relates to filters for gases, and more particularly to filters that can be used for high temperature work.

When filters are made from several different elements, the problem of sealing to prevent by-passing and leakage arises. The problem is complicated by the incompatibility of the different materials used. When the filter is to operate at high temperatures, from 200° F. and up, the problem is magnified greatly because former methods of sealing cannot be used. Of course, a one-piece filter is ideal, due to lack of fabrication problems, but the effective filtering area of such a unit is too limited in many cases.

It is among the objects of this invention to provide a filter which can be used at very high temperatures, which has a very large filtering area, which has no serious sealing problem, which can be handled as a one-piece filter, which has good chemical resistance, which is easy to install, which is light in weight, and which can easily be disposed of if contaminated with radio-active materials. Another object is to provide a method of manufacturing such a filter, which is simple, inexpensive, quick and easy.

In accordance with this invention, a sheet of filtering material, preferably made from mineral fibers such as glass, asbestos and fiber frax, is folded back and forth to form a pack of substantially parallel filter sheets that are spaced apart by pleated elements that have the side edges of their outermost pleats extending along the side edges of the strip. To hold the filter sheets and spacers together and to form a seal at opposite sides of the pack, the side edges are covered with a layer of dried slurry. Preferably, the slurry also covers the end filter sheets and is formed into a flange surrounding one end of the pack. For best results, the slurry is made from fibers the same or similar to those of the filtering material. Preferably, the pack is immersed in the slurry and suction is applied to its opposite ends to draw water out of the slurry and to deposit the slurry fibers on the pack.

The preferred embodiment of the invention is illustrated in the accompanying drawings, in which Fig. 1 is an isometric view of our filter;

Fig. 2 is a reduced planned view with the dried slurry indicated by broken lines;

Fig. 3 is a side view of the preceding figure;

Fig. 4 is an enlarged fragmentary horizontal section taken on the line IV—IV of Fig. 3; and Fig. 5 is a fragmentary vertical section taken on the line V—V of Fig. 4.

Referring to the drawings, a long strip of filtering material is folded back and forth in accordion pleated style to form a pack of filter sheets 1 that are integrally connected together. The sheets are held in spaced parallel relation by spacing elements 2 between them. To permit gas to have access to the sheets, the spacers are pleated or corrugated, with the side edges of their outermost pleats extending along the side edges of the strip; that is, along the edges of the filter sheets. This permits gas to enter or leave the channels formed by the pleats in each spacer by way of the end or open face. The spacers are prevented from blocking off any greater area of the filter sheets than necessary, by making the pleat folds as sharp as possible.

Although the filtering sheets may be made of any suitable material, it is preferred to use mineral fibers such as glass, asbestos and fiber frax. Such material makes a very good filter, and it also can stand high temperatures and has other advantages such as chemical resistance and lightness in weight.

The opposite ends 3 of the filter strip preferably are turned outward substantially perpendicularly to the pack. The pack, with the spacers between the filter sheets, is clamped together temporarily in any suitable manner and then a slurry is applied to at least the two opposite sides of it where the edges of the sheets are located. For best results the slurry is formed from water and from fibers the same or similar to those forming the filtering material. The slurry can be applied to the filter pack by spraying, pouring, casting, plastering, molding, or wet wrapping around the pack. However, the preferred method of application is to mount the filter pack in a suitable holder, immerse it in the slurry and then apply suction to the opposite ends of the pack to draw the water through the exposed sides. This pulls the slurry fibers against the sides of the pack and builds up a mat or layer 4 of them which will adhere to the pack when it is withdrawn from the slurry bath. The thickness of the layer can be controlled by slurry formulation, viscosity of slurry, and the length of time the pack is left in the slurry tank.

The slurry has to be applied to at least the two opposite sides of the pack where the edges of the filter sheets and spacers are located. When the slurry covering those two sides dries, it holds the sheets and spacers together and thereby holds the pack in shape. It also seals the sides of the pack so that gas cannot enter or leave the sides of the spaces between the sheets without being filtered by the dried slurry layers, since the slurry layers can be made as good a filter as the filtering sheets. Generally however, the dried slurry will be made too thick for filtering. In most cases it is desirable to cover all four sides of the filter pack with slurry, thereby forming a case or frame around it. Application of the slurry to the two end sheets of the pack is accomplished simply by applying suction to the spaces behind them, so that water is drawn through the end sheets and fibers are drawn against and piled on their outer surfaces.

There is more of a problem in covering the other two sides of the pack with slurry fibers, because suction applied to the side channels of the spacers 2 will tend to collapse them. Among different ways of overcoming this difficulty, the opposite side edges of each spacer can be folded into the shape of a rectangular tube 6, as shown in Fig. 4. Since the spacers need not be made of filtering material, although it is best that they be made of similar material as the filter sheets, e. g. mineral fiber, the outer wall of each spacer tube 6 is provided with a series of perforations 7 to let the slurry water pass through rapidly. The result is that the slurry fibers will be drawn against the sides of the pack into the perforations to bind all parts together into a strong, light weight assembly.

If the filter is to be clamped in place at both ends when in use, the dried slurry frame around the filter pack should be made thick enough for that purpose, but if the filter is to be held at only one end, a very thin frame will be sufficient. In such a case, however, a flange 9 of dried slurry is formed around one end of the pack, with the out-turned ends 3 of the filter strip molded into the flange.

Such a flange makes a sealing gasket unnecessary because the flange is resilient and can serve the same purpose.

The use of a slurry to form a frame and flange for the filter pack means that the slurry fibers will in effect join with the fibers of the pack. Since all of the elements of the filter are made of compatible materials, especially when made of similar basic materials, they will react alike to chemical attack, expansion and contraction, high temperatures and aging. There are no ceramic adhesives to crack because of differences in coefficients of expansion, rough handling or general deterioration.

If the filter becomes radioactive in use so that a problem of disposal arises, the problem can easily be solved by crushing it to about one-third its original volume, or by melting it into a slug of very small size. In either case the remaining body can be disposed of without difficulty.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A filter comprising a pack of substantially parallel and integrally connected filter sheets formed from a strip of filtering material folded back and forth, pleated spacers between said sheets having their opposite side edges extending along the side edges of said strip, and a layer of dried slurry covering said side edges to hold the sheets and spacers together and form a seal for opposite sides of the pack.

2. A filter in accordance with the preceding claim in which said slurry layer also covers the end filter sheets to form a frame around said pack.

3. A filter in accordance with claim 1, in which a flange of said dried slurry surrounds one end of said pack.

4. A filter in accordance with claim 1, in which said filtering material and slurry are made of substantially the same kind of fibers.

5. A filter in accordance with claim 1, in which the outermost folds of each spacer are provided with perforations filled with dried slurry.

6. A filter in accordance with claim 1, in which the side edges of the spacers are folded into the shape of tubes, and the outer side of each tube is perforated.

7. A filter comprising a pack of substantially parallel and integrally connected filter sheets formed from a strip of filtering material folded back and forth, pleated spacers between said sheets having the side edges of their outermost pleats extending along the side edges of said strip, the opposite ends of said strip being turned outward substantially perpendicularly to said pack, a layer of dried slurry covering said side edges to hold the sheets and spacers together and form a seal for opposite sides of the pack, and a flange of said dried slurry surrounding one end of the pack with said out-turned ends of the strip embedded in the flange.

8. A filter in accordance with the preceding claim, in which said slurry layer also covers the end filter sheets, whereby only the opposite ends of said pack and spacers are exposed.

9. The method of making a filter, comprising folding a strip of filtering material back and forth to form a pack of substantially parallel and integrally connected filter sheets, inserting between said sheets pleated spacers having the side edges of their outermost pleats extending along the side edges of said strip, immersing the pack in a slurry of water and fibers, creating suction at the ends of the pack to draw water out of the slurry and to draw fibers against the sides of the pack to form a fibrous layer thereon, and then drying said layer, whereby said sheets and spacers will be held together and their edges sealed.

References Cited in the file of this patent

UNITED STATES PATENTS

| | | |
|---|---|---|
| 2,008,751 | Davies | July 23, 1935 |
| 2,355,714 | Eberman | Aug. 15, 1944 |
| 2,397,759 | Sigmund | Apr. 2, 1946 |
| 2,410,371 | Vokes | Oct. 29, 1946 |
| 2,569,243 | Kovacs | Sept. 25, 1951 |